(No Model.)

W. B. HOSFORD.
PULLEY.

No. 459,067. Patented Sept. 8, 1891.

Witnesses:
T. J. Benjamin
S. P. Brashear, Jr.

Inventor
W. B. Hosford,
by Smith & Low
Attorneys

UNITED STATES PATENT OFFICE.

WILLIAM B. HOSFORD, OF MISHAWAKA, INDIANA.

PULLEY.

SPECIFICATION forming part of Letters Patent No. 459,067, dated September 8, 1891.

Application filed June 28, 1888. Serial No. 278,505. (No model.)

*To all whom it may concern:*

Be it known that I, WILLIAM B. HOSFORD, of Mishawaka, county of St. Joseph, and State of Indiana, have invented certain new and useful Improvements in Band-Pulleys; and I do declare the following to be a full, clear, and exact description of the same, reference being made to the accompanying drawings, in which—

Figure 1:
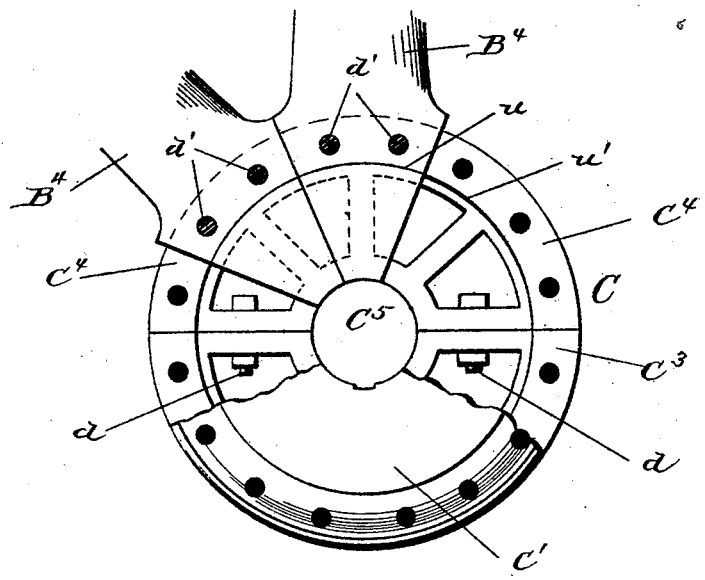
Figure 2:
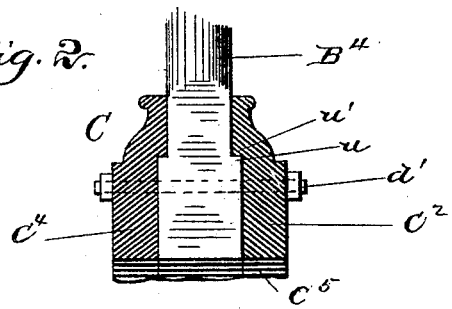
Figure 3:
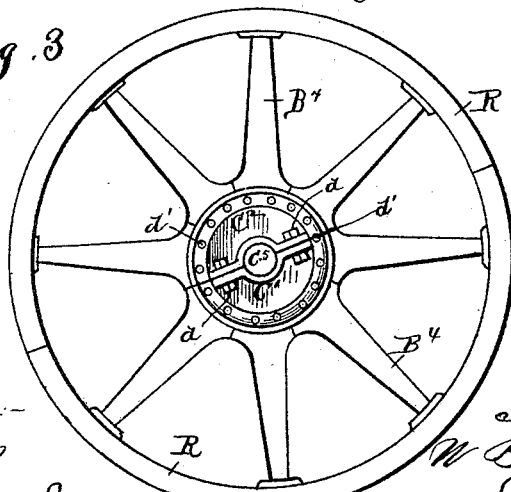

Figure 1 is an elevation showing so much of a pulley or band-wheel as is necessary to an understanding of my invention, one-half of the hub being removed and a portion only of the spokes being shown in place. Fig. 2 is a sectional view at right angles to Fig. 1 of portions of the opposite sides of the hub and the included part of one of the spokes. Fig. 3 is a side view of the entire pulley on a smaller scale.

In this invention the principal object aimed at is the firm anchorage of the spokes or arms in the hub at the same time that the pulley is readily separable for the purpose of handling it and applying it to or removing it from a shaft.

The hub is shown at C, and consists of four similar sections $C'$ $C^2$ $C^3$ $C^4$, secured together by transverse bolts $d'$ and bolts $d$, situated in planes parallel with the wheel. The two planes of division are respectively parallel with and at right angles to the line of the shaft. $C^5$ is the shaft-bearing formed in said sections.

$B^4$ indicates the spokes, which are secured at their outer ends to the separable rim R. The inner ends of the spokes are enlarged, so as to be provided with shoulders $u$, which are embraced within similar shoulders $u'$ within the hub-sections $C'$ $C^2$ $C^3$ $C^4$. By these means a secure fastening is attained for very heavy wheels. The meeting ends of the spokes may may be beveled and fitted together, as shown in Fig. 1.

A very important result gained in this mode of construction is a pulley from which the hub may be removed, leaving the rim and spokes intact, so that the hub may be removed and another substituted having a central bore of different diameter from the one removed, and thereby the pulley may be fitted to a shaft of any desirable diameter, it being easy to so fit and center all the parts in duplicate that it will not be difficult to remove one hub and replace it with another without disturbing the coincidence of axes.

Having thus described my invention, I claim—

1. In a split pulley, the combination of a separable rim, a four-part hub, the sections of which are provided with peripheral flanges, and spokes secured to the rim and having lateral shoulders adapted to fit within and to engage said flanges.

2. In a split pulley, the combination of a separable rim, a hub having two halves formed of a plurality of parts and each of which is provided with a shoulder or flange $u'$, and spokes $B^4$, secured to the rim and having lateral shoulders $u$, substantially as set forth.

WM. B. HOSFORD.

Witnesses:
IDA MIX,
D. O. FONDA.